(12) United States Patent
Saitou

(10) Patent No.: US 6,866,333 B2
(45) Date of Patent: Mar. 15, 2005

(54) VEHICLE FRONT BODY STRUCTURE

(75) Inventor: Tsutomu Saitou, Ayase (JP)

(73) Assignee: Nissan Motor Co., Ltd., Kanagawa-ken (JP)

(*) Notice: Subject to any disclaimer, the term of this patent is extended or adjusted under 35 U.S.C. 154(b) by 0 days.

(21) Appl. No.: 10/718,700

(22) Filed: Nov. 24, 2003

(65) Prior Publication Data

US 2004/0100127 A1 May 27, 2004

(30) Foreign Application Priority Data

Dec. 5, 2002 (JP) .................................... P 2002-353805

(51) Int. Cl.⁷ .............................................. B62D 25/08
(52) U.S. Cl. ............... 296/203.02; 296/29; 296/187.09; 293/155
(58) Field of Search ............................ 296/203.02, 29, 296/187.09, 203.01; 293/155

(56) References Cited

U.S. PATENT DOCUMENTS 4,466,653 A * 8/1984 Harasaki ................. 296/187.09
6,398,292 B2 * 6/2002 Tsuruta et al. ........... 296/187.09
6,729,429 B2 * 5/2004 Takahashi ................... 180/271

FOREIGN PATENT DOCUMENTS

JP P2000-177634 A 6/2000

* cited by examiner

*Primary Examiner*—Dennis H. Pedder
(74) *Attorney, Agent, or Firm*—McDermott Will & Emery LLP

(57) ABSTRACT

A vehicle front body structure which includes: a pair of side members extending in a vehicle longitudinal direction; a bumper reinforcing member connected to front ends of the side members; a cross member connected to bottoms of the side members in the vicinities of the front ends thereof; and a connecting member connected to the bumper reinforcing member and the cross member. Connection strength between the connecting member and the bumper reinforcing member in the vehicle longitudinal direction is lower than a flexural strength of the cross member in the vehicle longitudinal direction.

9 Claims, 5 Drawing Sheets

VEHICLE FRONT BODY STRUCTURE

BACKGROUND OF THE INVENTION

1. Field of the Invention

The present invention relates to a vehicle front body structure.

2. Description of Related Art

Japanese Patent Application Laid-Open NO. 2000-177634 discloses a vehicle front body structure, in which a bumper reinforcing member connecting front ends of side members and a cross member provided below the bumper reinforcing member are connected to each other.

SUMMARY OF THE INVENTION

With the above-mentioned vehicle front body structure in which the cross member is connected to the bumper reinforcing member to ensure the strength and rigidity of the cross member, when the bumper reinforcing member is deformed due to an impact load from the front of the vehicle body, the cross member is also deformed, thus causing high repair costs.

The present invention was made in the light of this problem. An object of the present invention is to provide a vehicle front body structure which suppresses deformation of a cross member due to a load from the front of a vehicle body.

An aspect of the present invention is a vehicle front body structure, comprising: a pair of side members each extending in a vehicle longitudinal direction; a bumper reinforcing member which connects the front ends of the side members; a cross member which connects the bottoms of the side members in the vicinities of the front ends thereof; and a connecting member which connects the bumper reinforcing member and the cross member, wherein connection strength between the connecting member and the bumper reinforcing member in the vehicle longitudinal direction is lower than a flexural strength of the cross member in the vehicle longitudinal direction.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
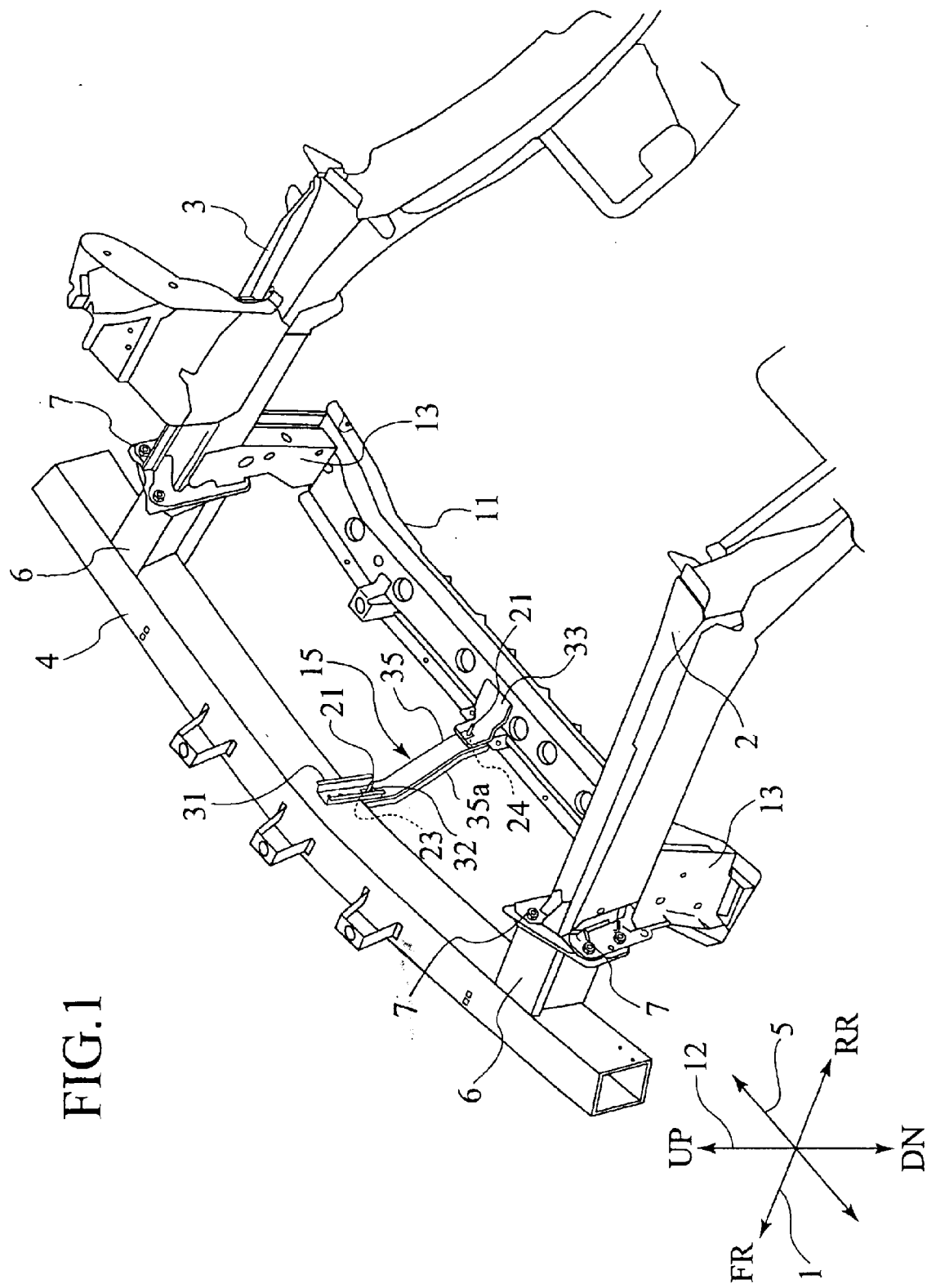
FIG. 1 is a perspective view of a vehicle front body structure according to an embodiment of the present invention.
Figure 2:
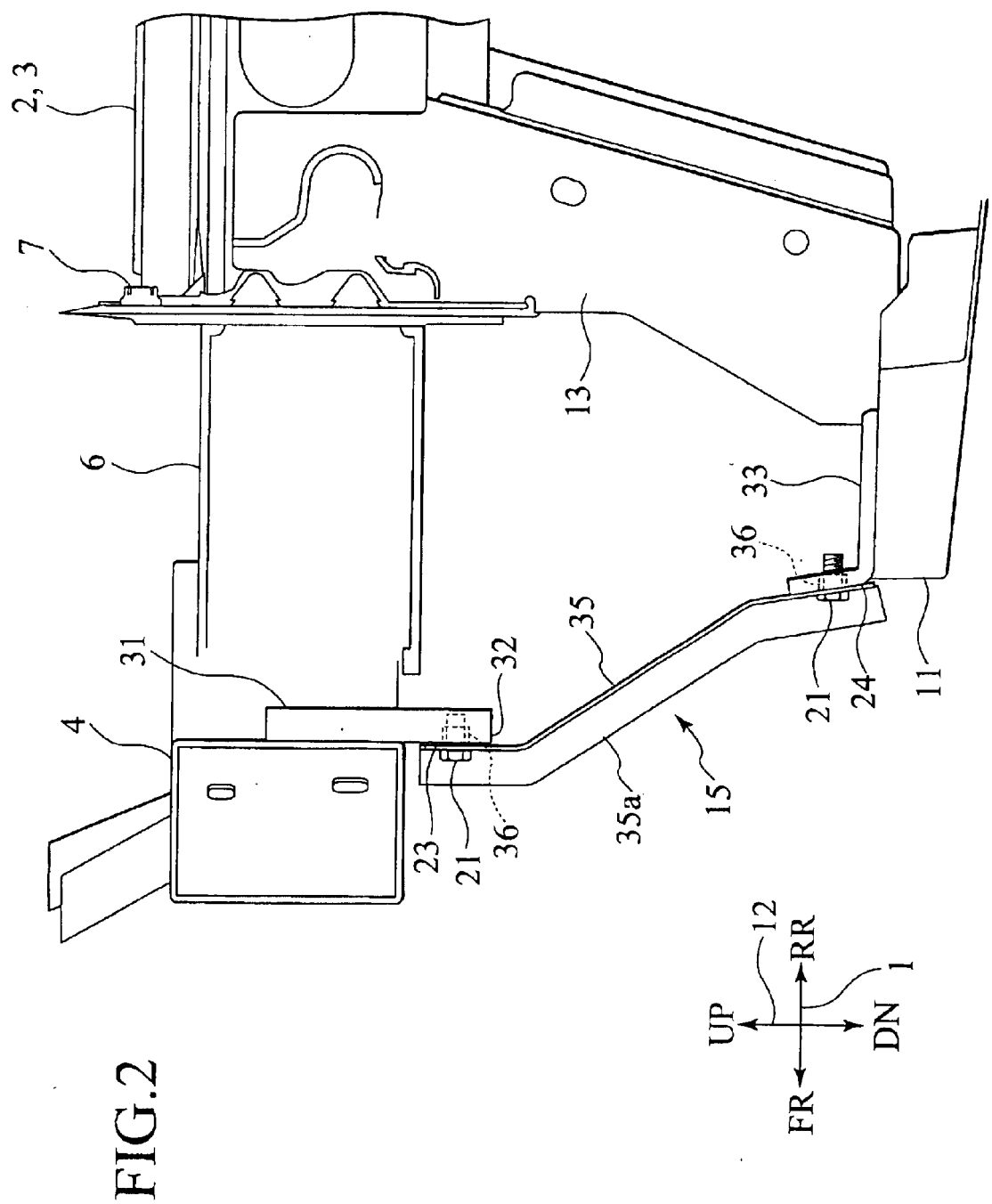
FIG. 2 is a side view of the vehicle front body structure of FIG. 1.

An embodiment of the present invention will be explained below with reference to the drawings, wherein like members are designated by like reference characters.

As shown in FIG. 1, in a vehicle front body structure of a vehicle such as an automobile, a bumper reinforcing member 4 to which a bumper (not shown) is attached, extends substantially in a vehicle transverse direction 5, and is connected between front ends of a pair of right and left side members 2 and 3 which extend substantially in an vehicle longitudinal direction 1. The bumper reinforcing member 4 is formed in a shape of a closed quadrangle in cross-section viewed from a side of the vehicle. From a rear side wall of the box-section bumper reinforcing member 4, a pair of right and left leg portions 6 are extended rearward, through which the bumper reinforcing member 4 is fixed to the front ends of the side members 2 and 3 with bolts 7.

Moreover, to the bottoms of the right and left side members 2 and 3 in vicinities of the front ends thereof, a cross member 11 (first cross member) is connected to extend substantially in the vehicle transverse direction 5. Specifically, the cross member 11 is located at the rear of and below the bumper reinforcing member 4 and extends substantially parallel to the bumper reinforcing member 4. A radiator (not shown) is fixed to this cross member 11. At both ends of the cross member 11, connecting brackets 13 are provided, extending from both ends of the cross member 11 substantially in a vertical direction 12, through which the cross member 11 and the bottoms of the front ends of the side members 2 and 3 are joined.

Moreover, the bumper reinforcing member 4 and the cross member 11 are connected by a connecting member 15 at approximate centers thereof in the vehicle transverse direction 5.

In this embodiment, connection strength between the connecting member 15 and the bumper reinforcing member 4 in the vehicle longitudinal direction is lower than the flexural strength of the cross member 11 in the vehicle longitudinal direction 1. Specifically, a strength/rigidity of connection/linkage at a connection point between the connecting member 15 and the bumper reinforcing member 4, or a strength/rigidity of the connecting member 15 itself, against a load applied to the bumper reinforcing member 4 in the vehicle longitudinal direction 1 is set to be low, so that a force transmitted to a connection point of the connecting member 15 and the cross member 11 is suppressed, and a bending load that is present in the cross member 11 when receiving the transmitted force is equal to or lower than the flexural strength of the cross member 11.

Figure 6:
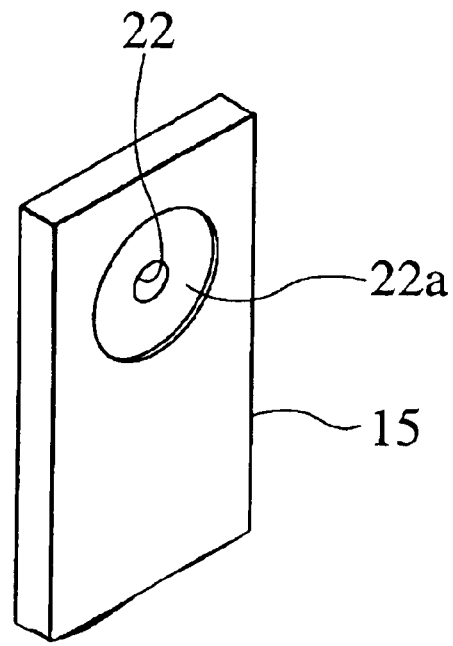
FIG. 6 is a perspective view showing a structure of a connection point of a connecting member of the vehicle front body structure of FIG. 1.
Figure 7:
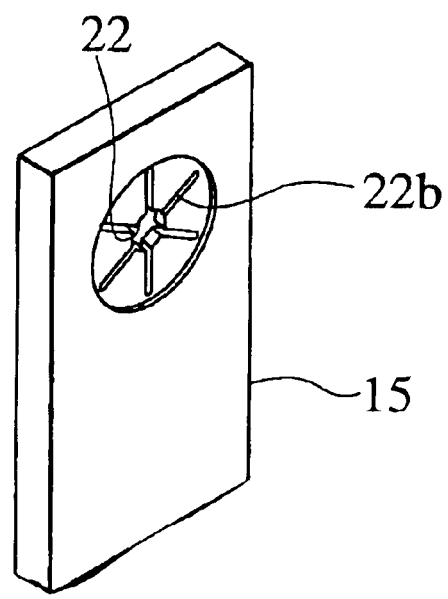
FIG. 7 is a perspective view showing another example of a structure of a connection point of the connecting member of the vehicle front body structure of FIG. 1.

The connecting member 15 is fastened by the use of bolts 21 from the front of the vehicle body at the connection points with the bumper reinforcing member 4 and with the cross member 11. The connection strength at each of the connection points can be adjusted by forming, for example, in bearing faces 23 and 24 for bolt fastening of the connecting member 15 where the bolts 21 are fastened, in the periphery of each bolt hole 22 thereof, thinned portions 22a (see FIG. 6) or radial notches 22b (see FIG. 7) which allow the bearing faces 23 and 24 to be deformed easier than the peripheral portions thereof by a force transmitted to the connection points when a load is applied to the bumper reinforcing member 4 in the vehicle longitudinal direction 1.

To the rear side wall of the bumper reinforcing member 4, at a substantial center thereof in the vehicle transverse direction 5, a bracket 31 is fixed by welding with its bolt fastening portion 32 at the lower end thereof, which is formed with a bolt hole 22 thereon, slightly protruded downward from a bottom face of a bottom wall of the bumper reinforcing member 4.

Similarly, another bracket 33 is fixed by welding to a top wall of the cross member 11 at a position in a substantial center thereof in the vehicle transverse direction 5, corresponding to the above-mentioned bracket 31. The bracket 33 is fixed in the state where a bolt fastening portion 34 in a front end thereof, which is formed with a bolt hole 22 thereon, is slightly protruded upward from a top face of the top wall of the cross member 11.

The connecting member 15 extending substantially in the vertical direction 12 is connected between the bolt fastening portion 32 of the bumper reinforcing member 4 and the bolt fastening portion 34 of the cross member 11. The connecting member 15 is formed into a shape curving in the vicinities of top and bottom ends thereof in order to accommodate the positional difference between the bolt fastening portions 32 and 34 in the vehicle longitudinal direction 1.

The connecting member 15 has a rib portion 35a and a flange 35. The rib portion 35a has its width substantially in the vehicle longitudinal direction 1 and its thickness substantially in the vehicle transverse direction 5. The flange 35 is formed by bending and extends from an edge of the rib portion 35a on a rear side thereof toward the vehicle transverse direction 5. The bearing faces 23 and 24 are provided in top and bottom end portions of the flange 35, and the bolt hole 22 is formed in each of the bearing faces 23 and 24. The thinned portion 22a or the radial notches 22b are formed in the periphery of each bolt hole 22 in the bearing faces 23 and 24. Thus, the bearing faces 23 and 24 are formed to be easily deformed compared with the peripheral portions thereof due to loads in a direction perpendicular to the bearing faces, which are applied thereto through heads of the bolts 21.

At rear sides of the bolt fastening portions 32 and 34 of the brackets 31 and 33, nuts 36 are provided respectively. These nuts 36 may be fixed to the brackets 31 and 33 by welding.

The bearing face 23 in the top end portion of the connecting member 15 is abutted on a front face of the bolt fastening portion 32 of the bracket 31 fixed to the bumper reinforcing member 4. Thereafter, the bolt 21 is inserted from the front of the vehicle body through the respective bolt holes 22 provided on the bolt fastening portion 32 and the bearing face 23. Then, the bolt 21 is screwed into the nut 36 provided on the rear side of the bolt fastening portion 32, and is tightened. Thus, the bumper reinforcing member 4 and the connecting member 15 are connected.

Similarly, the bearing face 24 in the bottom end portion of the connecting member 15 is abutted on a front face of the bolt fastening portion 34 of the bracket 33 fixed to the cross member 11. Thereafter, the bolt 21 is inserted from the front of the vehicle body through the respective bolt holes 22 provided on the bolt fastening portion 34 and the bearing face 24. Then, the bolt 21 is screwed into the nut 36 provided at the rear side of the bolt fastening portion 34, and is tightened. Thus, the cross member 11 and the connecting member 15 are connected.

In this way, the bumper reinforcing member 4 and the cross member 11 are connected by the connecting member 15.

Figure 3:
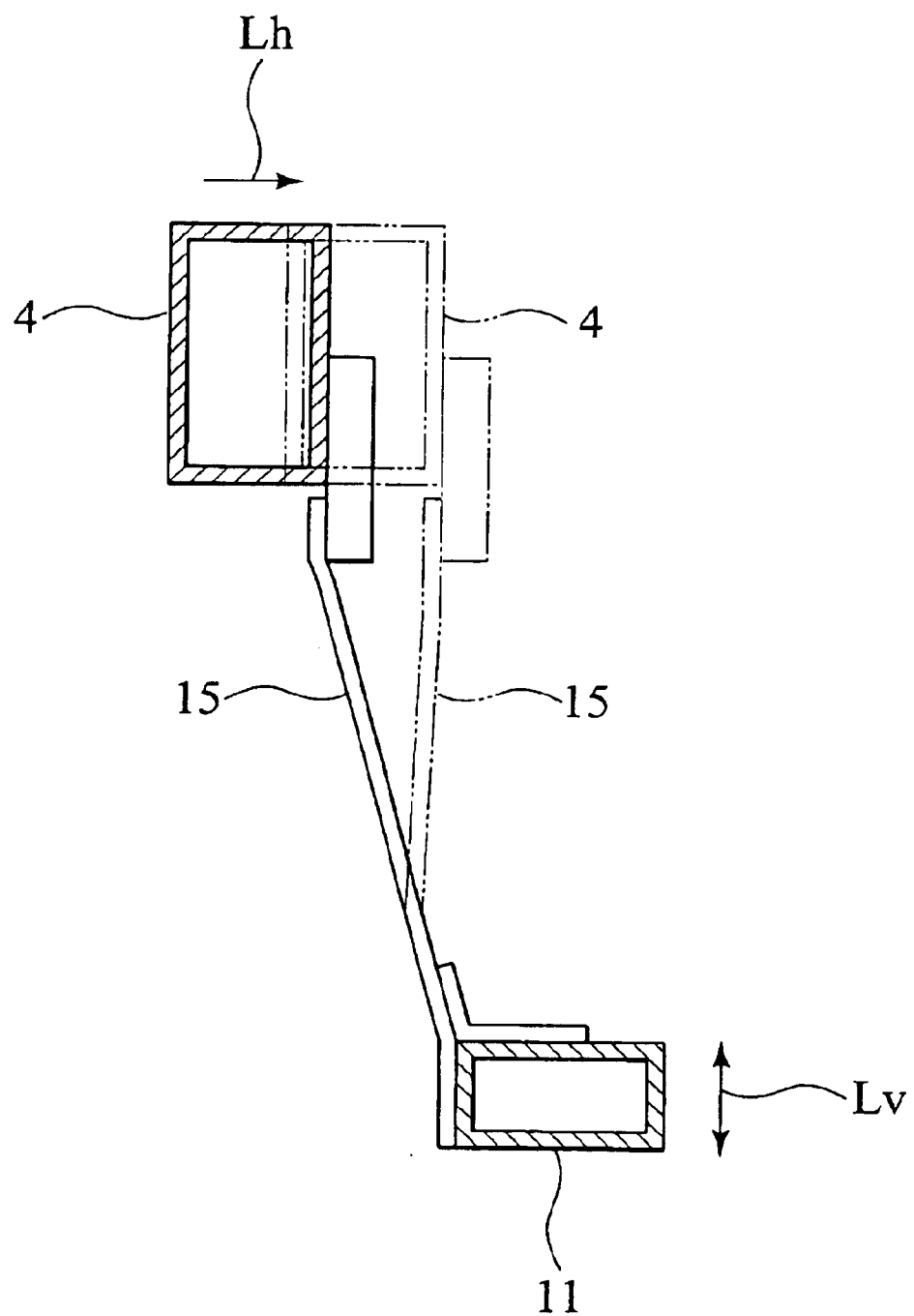
FIG. 3 is a view explaining a behavior of the vehicle front body structure of FIG. 1.

According to this embodiment, since the cross member 11 is supported, as shown in FIG. 3, by the bumper reinforcing member 4 through the connecting member 15, the cross member 11 has sufficient rigidity against a load Lv applied thereto in the vertical direction 12, thus supporting the load Lv. Therefore, it is possible to actively utilize the mass of the radiator attached to the cross member 11 as a dynamic damper for suppressing vibration of the vehicle body.

Further, the connection strength at the connection point of the connecting member 15 and the bumper reinforcing member 4, or the strength of the connecting member 15 itself, against a load applied to the bumper reinforcing member 4 in the vehicle longitudinal direction 1 is set to be low, so that a force transmitted to the connection point of the connecting member 15 and the cross member 11 is suppressed, and a bending load that is present in the cross member 11 when receiving the transmitted force is lower than the flexural strength of the cross member 11. Accordingly, when an impact load Lh is applied to the bumper from the front of the vehicle body, the connecting member 15 is either deformed easily or detached from the bumper reinforcing member 4 due to deformation of the bearing faces 23 and 24 thereof, allowing displacement of the bumper reinforcing member 4 relative to the cross member 11 in the vehicle longitudinal direction 1. Consequently, energy of the impact load Lh is absorbed by the bumper reinforcing member 4 and the connecting member 15, and thereby deformation of the cross member 11 is prevented.

Furthermore, the bumper reinforcing member 4 and the cross member 11 are connected to the connecting member 15 by bolt fastening from the front of the vehicle body, whereby the bolts 21 are configured to extend in the vehicle longitudinal direction. In addition, the thinned portion 22a or radial notches 22b are formed in the periphery of each bolt hole 22 in the bearing faces 23 and 24 of the connecting member 15 where the bolts 21 are fastened. Accordingly, the bearing faces 23 and 24 are constructed to be easily deformed compared with the peripheral portions thereof due to a force transmitted to the connection points when a load is applied to the bumper reinforcing member 4 in the vehicle longitudinal direction 1. The connection strength at each of the connection points against the load in the vehicle longitudinal direction 1 is thus controlled, while the rigidity in the vertical direction 12 is secured.

First Modification

Figure 4:
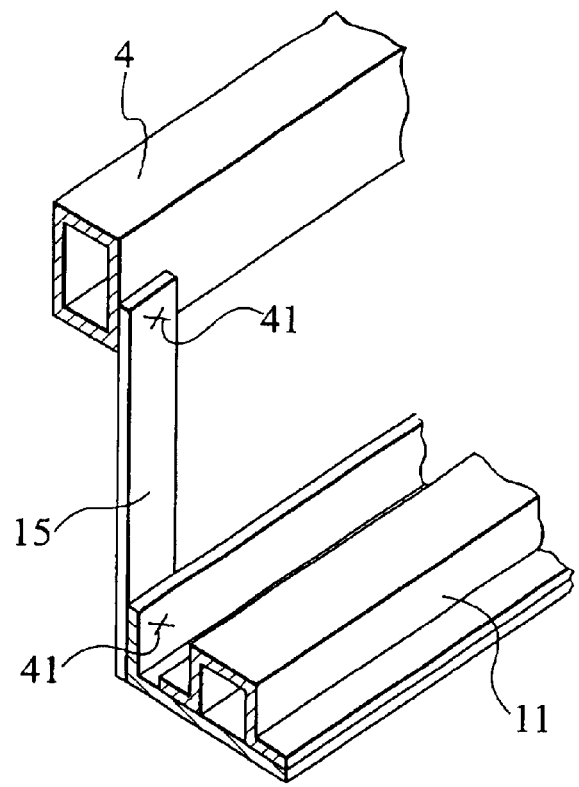
FIG. 4 is a perspective view partly in section showing a first modification of a main part of the vehicle front body structure of FIG. 1.

FIG. 4 shows a first modification of this embodiment, in which the connecting member 15 is formed in a substantially flat-plate shape with its width substantially in the vehicle transverse direction 5. This connection member 15 is directly connected to the rear side wall of the bumper reinforcing member 4 and a front face of the cross member 11 by spot welding or the like at welding points 41 of both end portions thereof. In this construction, the connection strength between the bumper reinforcing member 4 and the cross member 11 through the connecting member 15 can be increased in the vertical direction 12 and reduced in the vehicle longitudinal direction 1. For example, the connection strength at the connection point of the connecting member 15 and the bumper reinforcing member 4, or the strength of the connecting member 15 itself, against a load applied to the bumper reinforcing member 4 in the vehicle longitudinal direction 1, can be reduced, while rigidity of integrated members of the bumper reinforcing member 4 and the cross member 11 including the connecting member 15 against a load applied to the cross member 11 in the vertical direction 12 can be increased. The portions except for those described above are constructed similarly to those in the foregoing embodiment, and thus similar functions and effects can be obtained. Details of the portions not described herein conform to the description of the foregoing embodiment.

Second Modification

Figure 5:
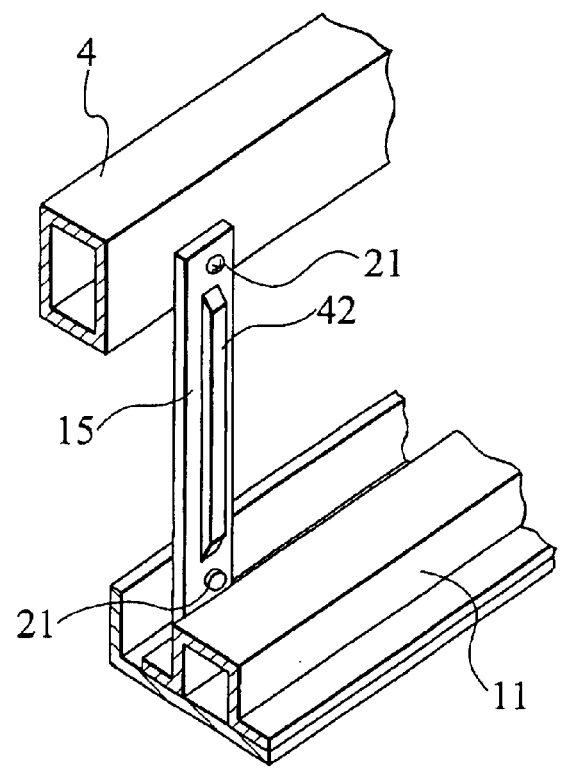
FIG. 5 is a perspective view partly in section showing a second modification of the main part of the vehicle front body structure of FIG. 1.

FIG. 5 shows a second modification of this embodiment, in which the connecting member 15 in a flat-plate shape having its width substantially in the vehicle transverse direction 5, is formed to have thereon a rib 42 extending between the top and bottom connection points of the connecting member 15 to the vicinities of the connection points thereof. With the changed cross-section of the connecting member 15 by provision of this rib 42, a load that is present in the connecting member 15 when a load is applied to the bumper reinforcing member 4 in the vehicle longitudinal direction 1, concentrates at each of the top and bottom connection points thereof. The connection strength at the connection points of the connecting member 15 in the vehicle longitudinal direction 1 is thus surely reduced. In this construction, the connection strength between the bumper reinforcing member 4 and the cross member 11 through the connecting member 15 can be increased in the vertical direction 12 and reduced in the vehicle longitudinal direction 1. The portions except for those described above are constructed similarly to those in the foregoing embodiment, and thus similar functions and effects can be obtained. Details of the portions not described herein conform to the description of the foregoing embodiment.

The present disclosure relates to subject matter contained in Japanese Patent Application No. 2002-353805, filed on Dec. 5, 2002, the disclosure of which is expressly incorporated herein by reference in its entirety.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

What is claimed is:

1. A vehicle front body structure, comprising:
   a pair of side members each extending in a vehicle longitudinal direction;
   a bumper reinforcing member which connects front ends of the side members;
   a cross member which connects bottoms of the side members at vicinities of the front ends thereof; and
   a connecting member which connects the bumper reinforcing member and the cross member,
   wherein connection strength between the connecting member and the bumper reinforcing member in the vehicle longitudinal direction is lower than a flexural strength of the cross member in the vehicle longitudinal direction.

2. The vehicle front body structure according to claim 1, wherein strength of connection at a connection point of the connecting member and the bumper reinforcing member against a load applied to the bumper reinforcing member in the vehicle longitudinal direction is lower than the flexural strength of the cross member.

3. The vehicle front body structure according to claim 1, wherein strength of the connecting member itself against a load applied to the bumper reinforcing member in the vehicle longitudinal direction is lower than the flexural strength of the cross member.

4. The vehicle front body structure according to claim 1, wherein the connecting member is fastened to at least one of the bumper reinforcing member and the cross member with a bolt, and is formed to have a bearing face for fastening the bolt by which the connection strength is adjusted.

5. The vehicle front body structure according to claim 4, wherein the bearing face of the connecting member is formed to be thinner than a peripheral portion thereof.

6. The vehicle front body structure according to claim 4, wherein the bearing face of the connecting member is formed to have radial notches.

7. The vehicle front body structure according to claim 4, wherein the bolt is configured to extend substantially in the vehicle longitudinal direction.

8. The vehicle front body structure according to claim 2, wherein the connecting member is connected to at least one of the bumper reinforcing member and the cross member by spot welding.

9. The vehicle front body structure according to claim 2, wherein the connecting member is formed in a plate shape having its width in a vehicle transverse direction and is formed to have thereon a rib extending to the connection point thereof.

\* \* \* \* \*